United States Patent
Ellicott et al.

(10) Patent No.: US 12,180,990 B2
(45) Date of Patent: Dec. 31, 2024

(54) RETENTION DEVICE

(71) Applicant: Caterpillar Inc., Peoria, IL (US)

(72) Inventors: Gabriel J. Ellicott, Peoria Heights, IL (US); Matthew Wayne Walsh, Congerville, IL (US); Brett Burke, Minier, IL (US); Jeffory Troy Curry, Mason City, IL (US)

(73) Assignee: Caterpillar Inc., Peoria, IL (US)

( * ) Notice: Subject to any disclaimer, the term of this patent is extended or adjusted under 35 U.S.C. 154(b) by 520 days.

(21) Appl. No.: 17/239,070

(22) Filed: Apr. 23, 2021

(65) Prior Publication Data
US 2022/0341461 A1 Oct. 27, 2022

(51) Int. Cl.
*F16B 39/36* (2006.01)

(52) U.S. Cl.
CPC ................... *F16B 39/36* (2013.01)

(58) Field of Classification Search
CPC ..... F16B 39/36; F16B 39/286; F16B 37/0864
USPC .......... 411/265–267, 277–280, 270
See application file for complete search history.

(56) References Cited

U.S. PATENT DOCUMENTS

| | | | | |
|---|---|---|---|---|
| 2,463,145 A | * | 3/1949 | Buchanan | H01R 4/52 439/784 |
| 3,352,341 A | * | 11/1967 | Schertz | F16B 37/0864 411/270 |
| 3,352,343 A | * | 11/1967 | Stitt | F16B 39/36 403/256 |
| 3,361,460 A | * | 1/1968 | Jansen | F16B 3/06 403/370 |
| 4,974,888 A | * | 12/1990 | Childers | F16B 37/0857 292/342 |
| 5,015,133 A | * | 5/1991 | Arena | F16B 35/00 411/433 |
| 5,393,165 A | * | 2/1995 | Rowan, Jr. | F16M 7/00 403/301 |
| 5,562,373 A | * | 10/1996 | Willingham | B23Q 1/58 408/56 |
| 6,095,713 A | * | 8/2000 | Doyle | F16B 7/04 403/103 |
| 6,247,884 B1 | * | 6/2001 | Bynum | F16B 39/286 411/327 |

(Continued)

FOREIGN PATENT DOCUMENTS

| | | |
|---|---|---|
| CN | 202780435 U | 3/2013 |
| CN | 205572309 U | 9/2016 |

(Continued)

*Primary Examiner* — William D Hutton, Jr.
*Assistant Examiner* — Dil K. Magar (57) ABSTRACT

In some implementations, a retention apparatus for retaining a rod in a cylinder rod may include a first retention component and a second retention component. The first retention component may be configured to retain the rod in the cylinder rod. The first retention component may comprise a first surface and a second surface. The portion, of the first surface, may be a threaded surface and may be adjacent to the second surface. The portion may be configured to be threaded onto the cylinder rod to cause the second surface to retain the second retention component in the cylinder rod and to cause the second retention component to engage the rod. The second retention component may be configured to engage the rod.

20 Claims, 7 Drawing Sheets

(56) References Cited

U.S. PATENT DOCUMENTS

| | | | | |
|---|---|---|---|---|
| 6,601,857 | B1 * | 8/2003 | Richmond | B23B 31/20125 |
| | | | | 277/622 |
| 6,712,574 | B1 * | 3/2004 | Roopnarine | F16B 37/0857 |
| | | | | 411/270 |
| 8,257,004 | B2 * | 9/2012 | Smith | F16B 37/0857 |
| | | | | 403/109.5 |
| 8,534,974 | B2 * | 9/2013 | Smith | F16B 37/0857 |
| | | | | 411/262 |
| 8,881,478 | B2 * | 11/2014 | Gray | E04B 1/26 |
| | | | | 52/223.14 |
| 9,181,967 | B2 * | 11/2015 | Lim | E04C 5/165 |
| 9,815,674 | B2 | 11/2017 | Foust et al. | |
| 9,915,277 | B2 * | 3/2018 | Oh | F16B 37/0864 |
| 10,047,772 | B2 | 8/2018 | Wallman et al. | |
| 10,850,376 | B2 | 12/2020 | Komatsu et al. | |
| 2003/0007844 | A1 * | 1/2003 | Terry | F16B 39/286 |
| | | | | 411/186 |
| 2003/0052462 | A1 * | 3/2003 | Komine | B23B 31/202 |
| | | | | 279/46.9 |
| 2005/0084327 | A1 * | 4/2005 | Chelchowski | F16L 19/086 |
| | | | | 403/345 |
| 2006/0088250 | A1 * | 4/2006 | Pimpinella | G02B 6/4471 |
| | | | | 385/53 |
| 2007/0207007 | A1 * | 9/2007 | Orange | F16B 39/36 |
| | | | | 411/270 |

FOREIGN PATENT DOCUMENTS

| | | | | |
|---|---|---|---|---|
| CN | 206010934 | U | | 3/2017 |
| CN | 108687711 | A | | 10/2018 |
| GB | 362692 | A | * 12/1931 | F16B 39/36 |

\* cited by examiner

RETENTION DEVICE

TECHNICAL FIELD

The present disclosure relates generally to a retention device and, for example, to a retention device for retaining a rod in a hydraulic cylinder rod.

BACKGROUND

A machine may include an implement (e.g., a boom, a stick, and/or a bucket) that includes one or more pins. The one or more pins may be provided in a bore. Occasionally, the one or more pins may be removed (e.g., from the bore) in order to be serviced. One example of removing a pin is by using a combination of tools including a threaded rod, a puller sleeve, a hydraulic cylinder with a cylinder rod, and a nut.

In this regard, a first end of the threaded rod may be threaded into the pin (to be removed) and the puller sleeve may be provided over the threaded rod, with a portion of the threaded rod extending through the puller sleeve. The hydraulic cylinder (with the cylinder rod) may be provided on the puller sleeve, with a portion of the threaded rod extending through the hydraulic cylinder. The cylinder rod may initially be retracted into the hydraulic cylinder. The nut may be threaded onto a second end of the threaded rod. The nut may contact the cylinder rod.

In order to remove the pin, the hydraulic cylinder may be actuated to cause the cylinder rod to extend out of the hydraulic cylinder and to pull the pin from the bore (e.g., toward the nut). In other words, a stroke of the hydraulic cylinder may cause the cylinder rod to be extended and to pull the pin from the bore. In some instances, the threaded rod may experience a failure. For example, the threaded rod may break (e.g., inside the puller sleeve or inside the hydraulic cylinder). In such instances, a portion of the threaded rod may be released from the cylinder rod, as the cylinder rod is being extended during a stroke of the hydraulic cylinder.

Chinese Patent Application Publication No. 108687711 (the '711 publication) discloses a bracket hydraulic pin remover including an extraction hydraulic cylinder and support device removably fitted together. The '711 publication discloses that the bracket hydraulic pin remover includes a cylinder body to extract a hydraulic cylinder and that a cylinder body inner seal sleeve is equipped with a hollow piston rod. The '711 publication further discloses that a rear end of the cylinder body is removably secured to a guiding end cap.

The '711 publication further discloses that a pull rod is arranged in a hollow piston rod and that a back end of a tie rod portion is equipped with a pull rod adjusting apparatus. The '711 publication further discloses that a rear end of the pull rod, which is twisted, is equipped with a stop nut, and that a front end of the pull rod, which is twisted, is equipped with a pull head.

While the '711 publication discloses a bracket hydraulic pin remover with a pull rod and a stop nut, the '711 publication does not disclose that the bracket hydraulic pin remover is configured to retain the pull rod in the event of a failure of the pull rod.

The retention device of the present disclosure solves one or more of the problems set forth above and/or other problems in the art.

SUMMARY

In some implementations, a retention device includes a collet nut configured to be inserted in a cylinder rod and to engage a threaded rod inserted in the cylinder rod, wherein the collet nut is configured to transition between a compressed state to engage the threaded rod and an expanded state to disengage from the threaded rod; and a retainer ring configured to retain the threaded rod in the cylinder rod, wherein the retainer ring comprises an outer surface and a bottom surface, wherein a first portion, of the outer surface, is a threaded surface and is adjacent to the bottom surface, wherein a second portion, of the outer surface, is configured to be torqued to cause the first portion to be threaded onto the cylinder rod and cause the bottom surface to contact the collet nut and retain the collet nut in the cylinder rod, and wherein the bottom surface is configured to cause the collet nut to transition from the expanded state to the compressed state as the bottom surface contacts the collet nut.

In some implementations, a retention system includes a collet nut configured to be inserted in a hydraulic cylinder rod and to engage a rod inserted in the hydraulic cylinder rod, wherein the collet nut comprises an inner surface; and a retention component configured to retain the rod in the hydraulic cylinder rod, wherein the retention component comprises a first surface and a second surface, wherein a portion, of the first surface, is a threaded surface and is adjacent to the second surface, wherein the portion, of the first surface, is configured to be threaded onto the hydraulic cylinder rod to cause the second surface to retain the collet nut in the hydraulic cylinder rod, and wherein the second surface is configured to exert a force on the collet nut to cause the inner surface, of the collet nut, to engage the rod.

In some implementations, a retention apparatus for retaining a rod in a cylinder rod includes a first retention component configured to retain the rod in the cylinder rod, wherein the first retention component comprises a first surface and a second surface, wherein a portion, of the first surface, is a threaded surface and is adjacent to the second surface, and wherein the portion is configured to be threaded onto the cylinder rod to cause the second surface to retain a second retention component in the cylinder rod and to cause the second retention component to engage the rod; and the second retention component configured to engage the rod.

DETAILED DESCRIPTION

The present disclosure is directed to a retention device configured to retain a rod in a hydraulic cylinder rod of a hydraulic cylinder. In some implementations, the retention device comprises a collet nut and a retention ring. The collet nut may refer to a nut with an inner surface that is a threaded surface. The collet nut may be segmented to enable the collet nut to transition between a compressed state (to engage the rod) and an expanded state (to disengage from the rod). For example, the collet nut may comprise multiple segments that enable the collet nut to transition between the compressed state and the expanded state. The retainer ring may refer to a fastener that includes a non-threaded portion and a threaded portion.

In some examples, the collet nut may be inserted in the hydraulic cylinder rod. The collet nut may be in the expanded state or in the compressed state when inserted in the hydraulic cylinder rod. The non-threaded portion of the retainer ring may be torqued to cause the threaded portion to be threaded onto the hydraulic cylinder rod and cause a bottom surface, of the retainer ring, to contact the collet nut and retain the collet nut in the hydraulic cylinder rod. As the threaded portion is threaded onto the cylinder rod, the bottom surface may exert a downward force/normal force on the collet nut. The downward force/normal force may push the collet nut downward in the hydraulic cylinder rod and cause the collet nut to transition from the expanded state (in which the collet nut is disengaged from the rod) to the compressed state (in which the collet nut engages the rod).

Based on the collet nut being in the compressed state and based on the retainer ring retaining the collet nut in the hydraulic cylinder rod, the retention device may retain the rod in the hydraulic cylinder rod. In this regard, the retention device may prevent the rod from being released from the hydraulic cylinder rod in the event of a failure (of the rod) occurring when the hydraulic cylinder rod is being extended during a stroke of the hydraulic cylinder.

Figure 1:
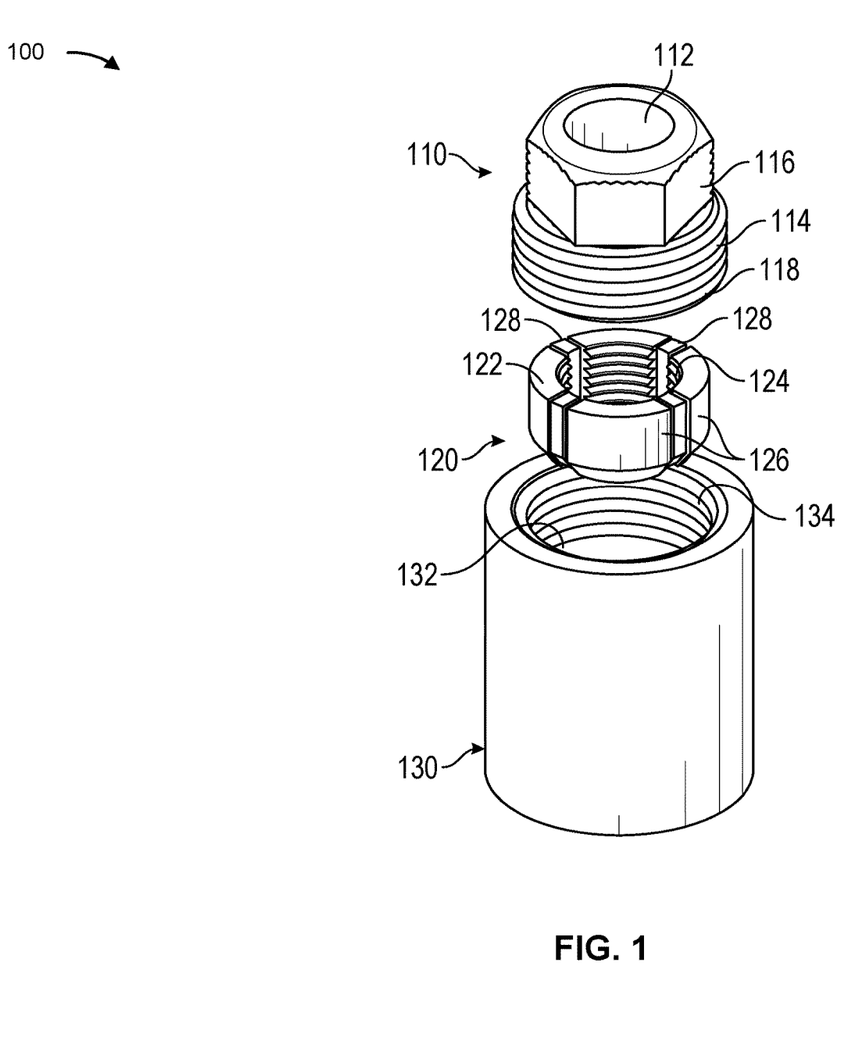
FIG. 1 is a diagram of an example exploded view of an example retention device described herein.

FIG. 1 is a diagram of an example exploded view of an example retention device 100 described herein. As shown in FIG. 1, retention device 100 may include a first retention component 110 and a second retention component 120. First retention component 110 may be configured to be threaded onto a hydraulic cylinder rod 130 (of a hydraulic cylinder) and second retention component 120 may be configured to be inserted in hydraulic cylinder rod 130. Second retention component 120 may be in the expanded state or the compressed state when inserted in hydraulic cylinder rod 130. One or more of first retention component 110, second retention component 120, or hydraulic cylinder rod 130 may comprise a metal such as titanium, aluminum, steel, brass, bronze, among other examples.

As shown in FIG. 1, first retention component 110 is illustrated as a retainer ring. Alternatively, first retention component 110 may be another type of mechanical fastener that may be fastened onto hydraulic cylinder rod 130. As shown in FIG. 1, first retention component 110 may comprise a ring inner surface 112, an outer surface comprising a first portion 114, a second portion 116, and a ring bottom surface 118. Ring inner surface 112 may be a non-threaded surface. In some examples, ring inner surface 112 may be a smooth surface. Ring inner surface 112 may be configured to receive a rod inserted in hydraulic cylinder rod 130. In some examples, a dimension of ring inner surface 112 may be configured to match a dimension of the rod. As shown in FIG. 1, first portion 114 may be a threaded surface and may be adjacent to ring bottom surface 118. In some examples, a diameter of threads of the threaded surface may be exceed a threshold diameter. First portion 114 may be configured to be threaded onto hydraulic cylinder rod 130. In some implementations, first portion 114 may be implemented as a cam guide (e.g., implemented as a cam mechanism).

As shown in FIG. 1, second portion 116 may be a non-threaded surface. In some examples, second portion 116 may be a knurled surface. As shown in FIG. 1, a shape of second portion 116 is a hexagonal shape. Alternatively, the shape of second portion 116 may be a square shape, a circular shape, among other examples. Second portion 116 may be configured to be torqued to cause first portion 114 to be threaded onto hydraulic cylinder rod 130 and cause ring bottom surface 118 to contact second retention component 120 and retain second retention component 120 in hydraulic cylinder rod 130. In some examples, second portion 116 may be torqued using a hex torque wrench, torqued using a wrench flat, torqued by hand, among other examples. In some examples, second portion 116 may include a handle or a built-in lever, as described below in FIG. 6.

Ring bottom surface 118 may be configured to contact second retention component 120 and exert a force (e.g., a downward force or a normal force) on second retention component 120, as first portion 114 is threaded onto hydraulic cylinder rod 130. The force may push second retention component 120 downward in hydraulic cylinder rod 130 and, accordingly, second retention component 120 may transition from the expanded state to the compressed state, as explained herein.

As shown in FIG. 1, second retention component 120 is illustrated as a collet nut. Alternatively, second retention component 120 may be another type of mechanical fastener that may be configured to transition between the expanded state (to disengage from the rod inserted in hydraulic cylinder rod 130) and the compressed state (to engage the rod). As shown in FIG. 1, second retention component 120 may comprise a top surface 122, a nut inner surface 124, and a bottom surface (discussed in connection with FIG. 2). Top surface 122 may be configured to mate with ring bottom surface 118. In some examples, top surface 122 may be a tapered surface. Nut inner surface 124 may be a threaded surface. Nut inner surface 124 may be configured to disengage from the rod and engage the rod (e.g., as second retention component 120 transitions between the expanded state and the compressed state). For example, the threaded surface, of nut inner surface 124, may be configured to engage a threaded surface of the rod and to disengage from the threaded surface of the rod.

As shown in FIG. 1, second retention component 120 may comprise multiple segments 126 and a transition element 128 between one or more pairs of segments 126. In the compressed state, segments 126 may be compressed inwardly toward rod 210 to engage rod 210. As the force from ring bottom surface 118 is removed (e.g., as first retention component 110 is unthreaded from hydraulic cylinder rod 130), segments 126 may separate one from another to disengage from the rod.

Transition element 128 may be configured to enable second retention component 120 to return to the expanded state from the compressed state. For example, as the force from ring bottom surface 118 is removed (e.g., as first retention component 110 is unthreaded from hydraulic cylinder rod 130), transition element 128 may be configured to exert an outward force between each pair of segments 126. Transition element 128 may comprise an elastomeric material (e.g., a rubber material), one or more springs, among other examples of elements that may enable second retention component 120 to transition between the expanded state and the compressed state.

As shown in FIG. 1, hydraulic cylinder rod 130 may comprise a cylinder inner surface 132. Cylinder inner surface 132 may be configured to receive the rod (discussed above). Cylinder inner surface 132 may include a threaded surface 134. In this regard, first portion 114 may be configured to be threaded onto threaded surface 134 of hydraulic cylinder rod 130. In some examples, a diameter of threads of threaded surface 134 may exceed the threshold diameter. In some instances, the diameter of threads of threaded surface 134 may match the diameter of threads of first portion 114 to enable first portion 114 to be properly threaded onto threaded surface 134.

As indicated above, FIG. 1 is provided as an example. Other examples may differ from what was described in connection with FIG. 1.

Figure 2:
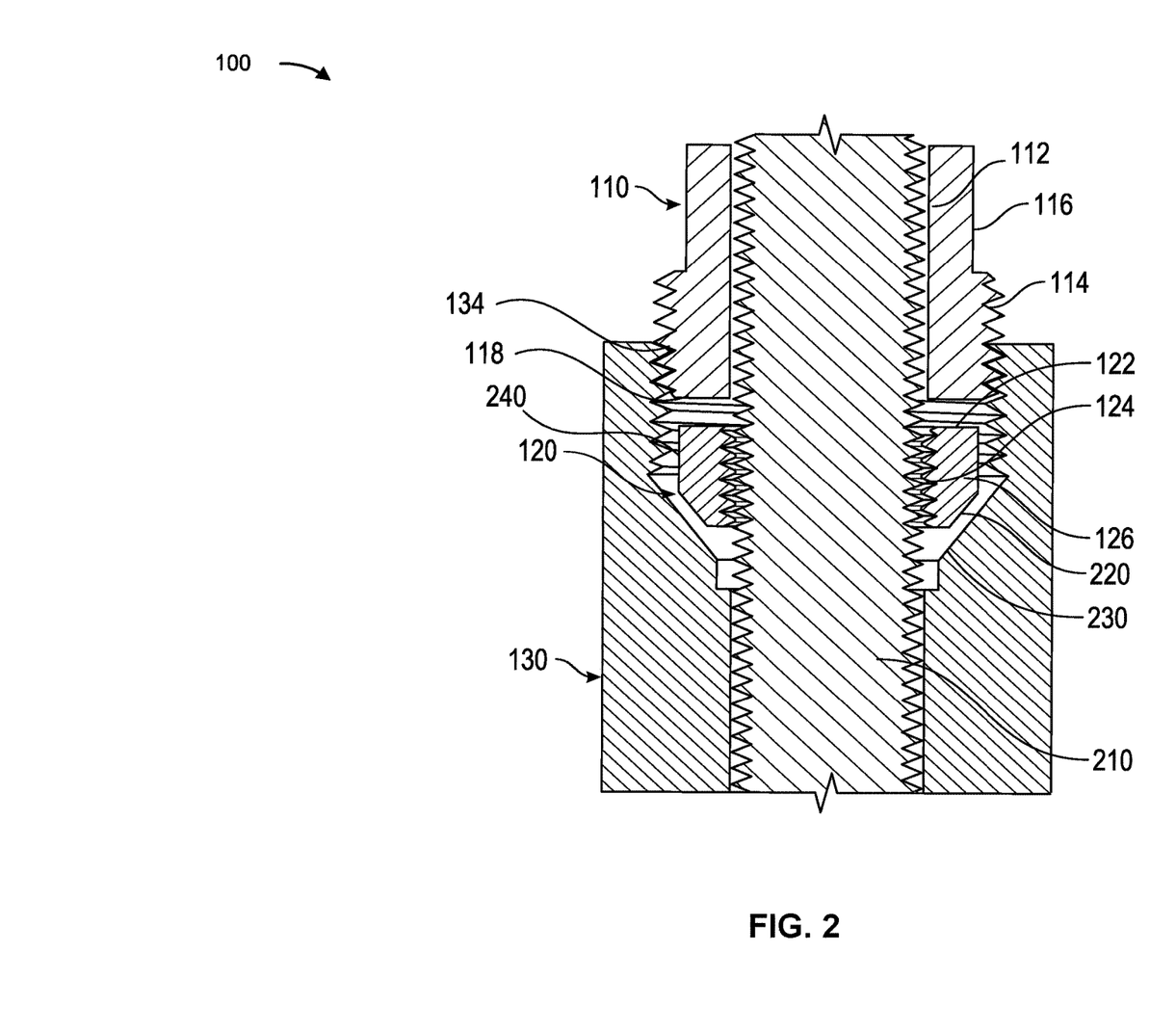
FIG. 2 is a diagram of an example cross-sectional view of an example retention device described herein.

FIG. 2 is a diagram of an example cross-sectional view of an example retention device 100 described herein. The elements of retention device 100 have been described above with respect to FIG. 1. Assume that rod 210 has been inserted in hydraulic cylinder rod 130 for the purpose of removing a pin. As shown in FIG. 2, rod 210 may be received by cylinder inner surface 132 of hydraulic cylinder rod 130 and by ring inner surface 112 of first retention component 110. In some examples, rod 210 may be a threaded rod. For instance, one or more portions of rod 210 may comprise a threaded surface.

As shown in FIG. 2, first retention component 110 may be threaded onto hydraulic cylinder rod 130. Ring bottom surface 118, of first retention component 110, may be separated from top surface 122 of second retention component 120. In other words, ring bottom surface 118 may not be contacting second retention component 120 and, therefore, may not be exerting the force on second retention component 120. Accordingly, second retention component 120 may be in the expanded state. For example, second retention component 120 (e.g., segments 126) may be disengaged from rod 210. As shown in FIG. 2, the threaded surface, of nut inner surface 124 of second retention component 120, may be disengaged from rod 210 when second retention component 120 is in the expanded state.

In some implementations, when hydraulic cylinder rod 130 is extended out of the hydraulic cylinder (e.g., as a result of a stroke of the hydraulic cylinder), first retention component 110 may be unthreaded (e.g., partially unthreaded) from hydraulic cylinder 130. As a result of first retention component 110 being unthreaded, second retention component 120 may be in the expanded state, as shown in FIG. 2.

As shown in FIG. 2, bottom surface 220, of second retention component 120, may comprise a tapered surface and cylinder inner surface 132, of hydraulic cylinder rod 130, may comprise a tapered surface 230. In some examples, the tapered surface (e.g., an angle of the tapered surface), of bottom surface 220, may match tapered surface 230 (e.g., an angle of tapered surface 230). In some instances, the tapered surface, of bottom surface 220, may match tapered surface 230 in order to facilitate a downward movement of second retention component 120 in hydraulic cylinder rod 130. In some examples, an outer surface 240, of second retention component 120, may comprise a tapered surface.

As indicated above, FIG. 2 is provided as an example. Other examples may differ from what was described in connection with FIG. 2.

Figure 3:
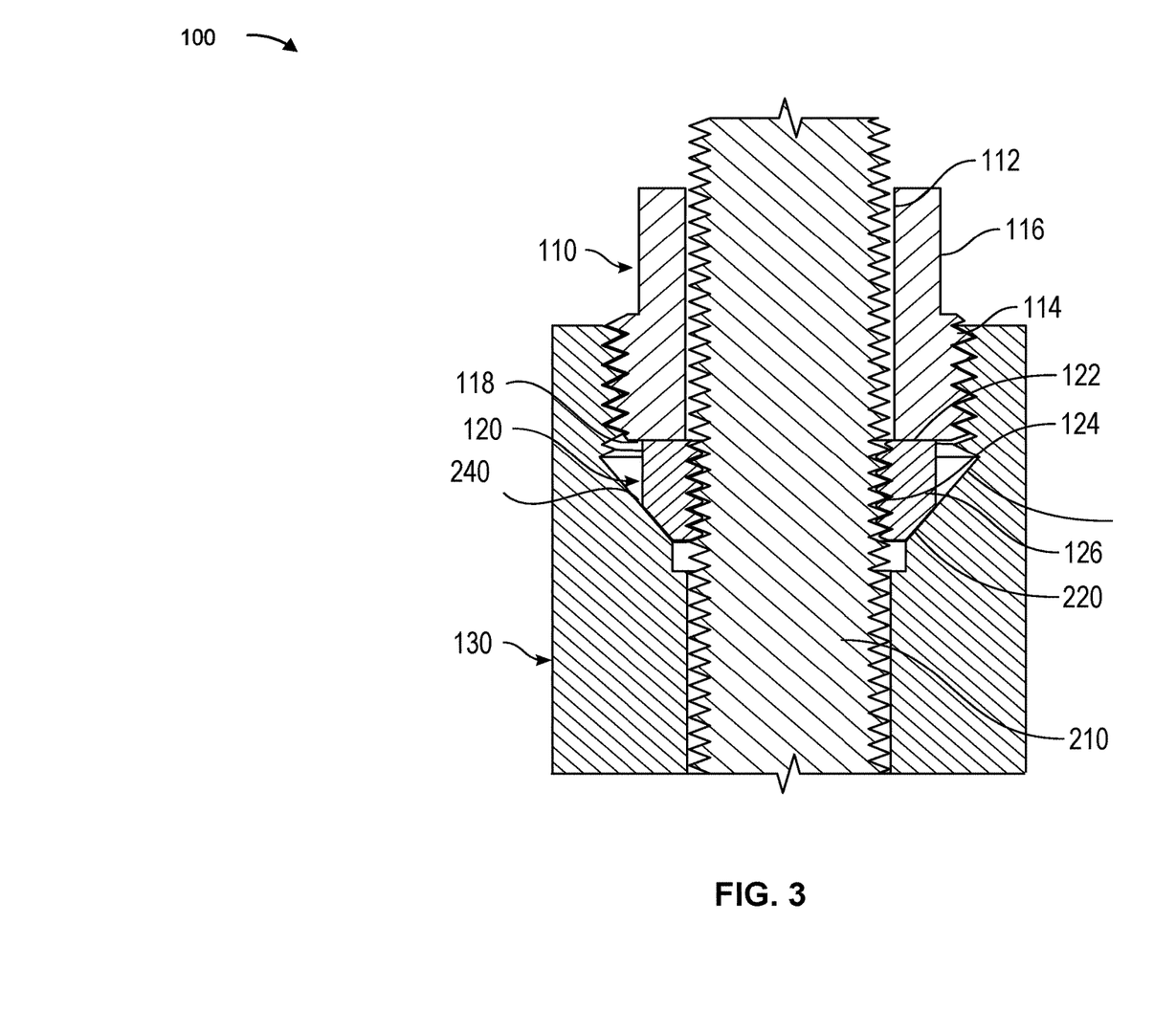
FIG. 3 is a diagram of an example cross-sectional view of an example retention device described herein.

FIG. 3 is a diagram of an example cross-sectional view of an example retention device 100 described herein. The elements of retention device 100 have been described above with respect to FIGS. 1 and 2. Assume that hydraulic cylinder rod 130 has been retracted into the hydraulic cylinder, prior to a subsequent stroke of the second retention component 120. As shown in FIG. 3, first retention component 110 may threaded onto hydraulic cylinder rod 130 to cause ring bottom surface 118, of first retention component 110, to contact second retention component 120. As first retention component 110 is threaded onto hydraulic cylinder rod 130, ring bottom surface 118 may exert the force on second retention component 120. The force may cause a downward movement of second retention component 120 into hydraulic cylinder rod 130 and, thereby cause second retention component 120 to transition from the expanded state (in which second retention component 120 is disengaged from rod 210) to the compressed state (in which second retention component 120 engages rod 210). In some implementations, the downward movement of second retention component 120 may be stopped when bottom surface 220 contacts tapered surface 230.

As shown in FIG. 3, second retention component 120 (e.g., segments 126) may engage rod 210. For example, the threaded surface, of nut inner surface 124 of second retention component 120, may be configured to engage rod 210 when second retention component 120 is the compressed state.

Based on second retention component 120 being in the compressed state and based on first retention component 110 retaining second retention component 120 in hydraulic cylinder rod 130, retention device 100 may retain rod 210 in hydraulic cylinder rod 130. In this regard, retention device 100 may prevent rod 210 from being released from hydraulic cylinder rod 130 in the event of a failure (of rod 210) occurring when hydraulic cylinder rod 130 is being extended during a stroke of the hydraulic cylinder.

As indicated above, FIG. 3 is provided as an example. Other examples may differ from what was described in connection with FIG. 3.

Figure 4:
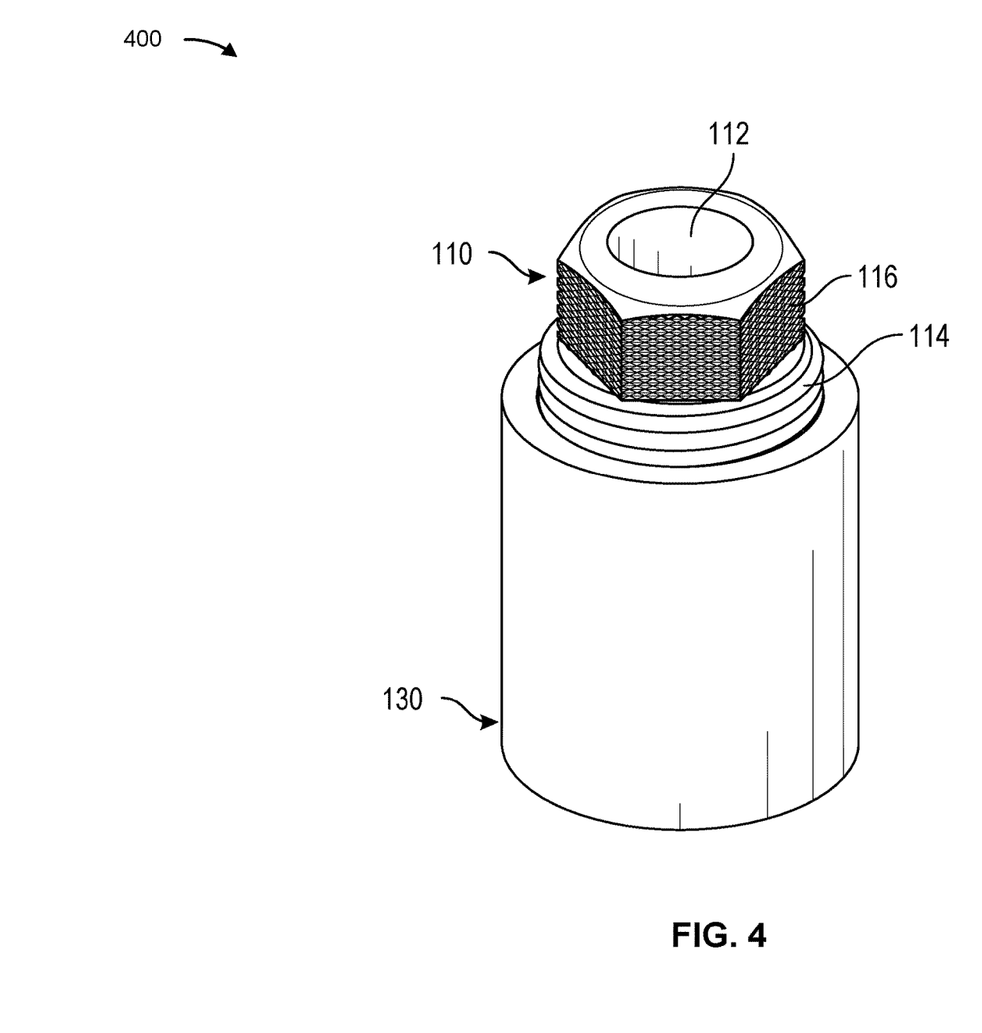
FIG. 4 is a diagram of an example retention system as described herein.

FIG. 4 is a diagram of an example retention system 400 as described herein. The elements of retention system 400 have been described above with respect to FIG. 1. Retention system 400 may include first retention component 110, second retention component 120 (not shown), and hydraulic cylinder rod 130. As shown in FIG. 4, first retention component 110 may be threaded onto hydraulic cylinder rod 130. Second retention component 120 (not shown) may be inserted (in the expanded state) in hydraulic cylinder rod 130, prior to first retention component 110 being threaded onto hydraulic cylinder rod 130.

While the foregoing example has been described as first retention component 120 being threaded onto hydraulic cylinder rod 130, in some embodiments, first retention component 120 may be fastened to hydraulic cylinder rod 130 via one or more other mechanisms. For example, first retention component 110 may be fastened to hydraulic cylinder rod 130 via a cam locking mechanism.

As indicated above, FIG. 4 is provided as an example. Other examples may differ from what was described in connection with FIG. 4.

Figure 5:
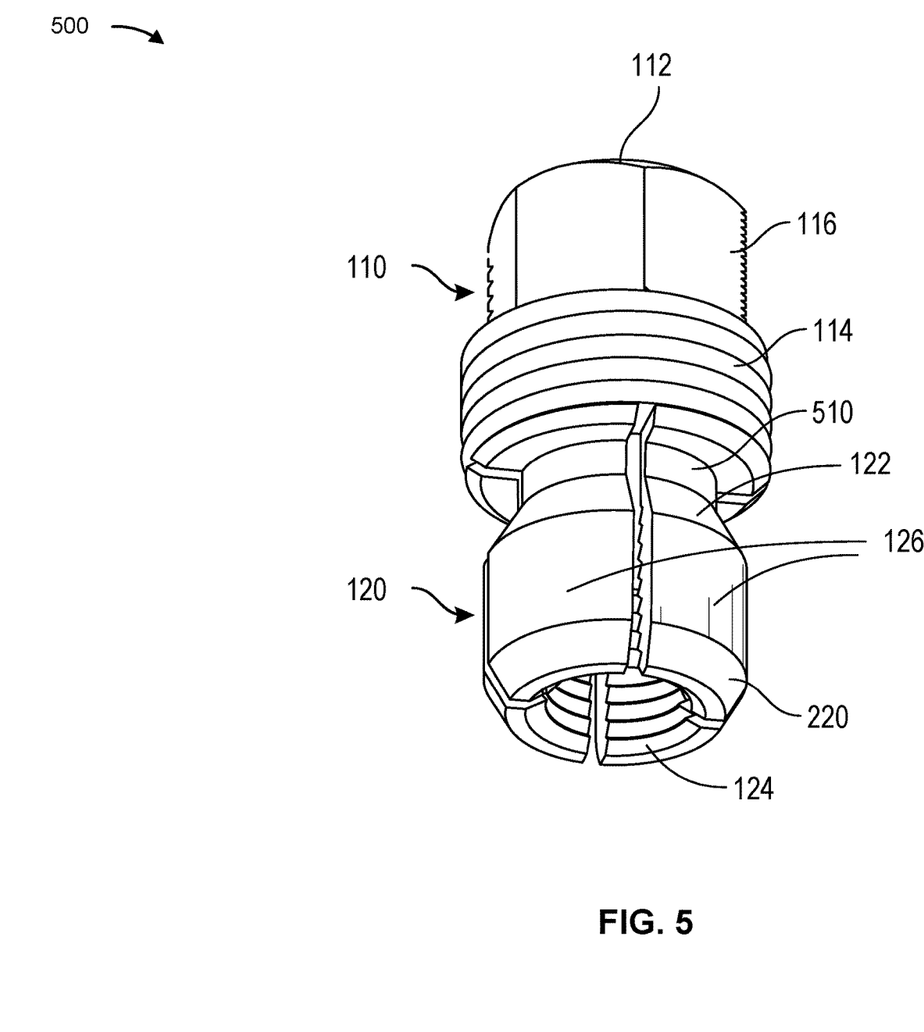
FIG. 5 is a diagram of an example retention device as described herein.

FIG. 5 is a diagram of an example retention device 500 as described herein. The elements of retention system 500 have been described above with respect to FIGS. 1-3. As shown in FIG. 5, retention device 500 may be a single retention device that combines first retention component 110 and second retention component 120. First retention component 110 and second retention component 120 may be combined (or connected) via a shaft 510. As shown in FIG. 5, top surface 122 may be a tapered surface and bottom surface 220 may be a tapered surface.

In some implementations, second portion 116 may be configured to be torqued to cause first portion 114 to be threaded onto hydraulic cylinder rod 130, in a manner similar to the manner described in connection with FIGS. 1-3. First portion 114 may be configured to be threaded onto hydraulic cylinder rod 130 to cause second retention component 120 to be pushed downward in hydraulic cylinder rod 130. As second retention component 120 is pushed downward in hydraulic cylinder rod 130, second retention component 120 may transition from the expanded state to the compressed state. Conversely, first portion 114 may be configured to be unthreaded from hydraulic cylinder rod 130 to cause second retention component 120 to be pulled from hydraulic cylinder rod 130. As second retention component 120 is pulled from hydraulic cylinder rod 130, second retention component 120 may transition from the compressed state to the expanded state.

As indicated above, FIG. 5 is provided as an example. Other examples may differ from what was described in connection with FIG. 5.

Figure 6:
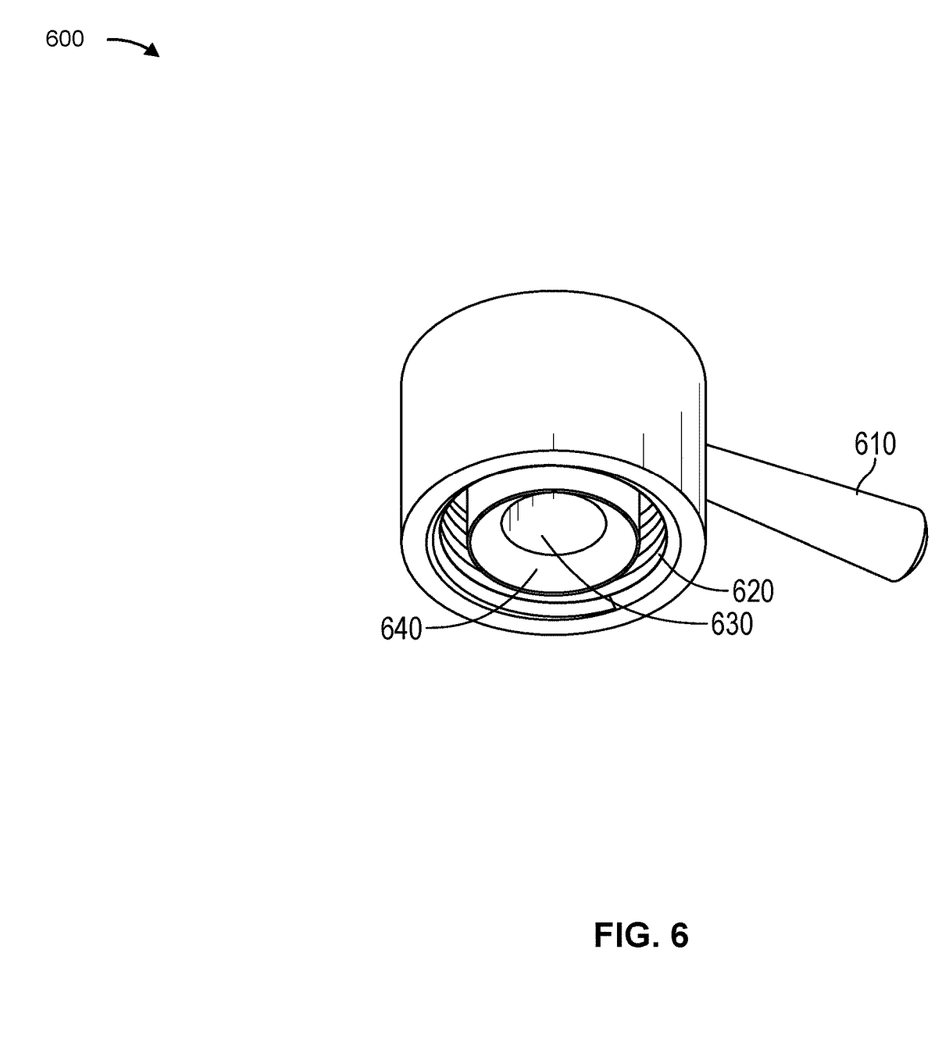
FIG. 6 is a diagram of an example retention component as described herein.

FIG. 6 is a diagram of an example retention component 600 as described herein. As shown in FIG. 6, retention component 600 comprises a torqueing element 610, a first inner surface 620, a second inner surface 630, and a bottom surface 640. Torqueing element 610 may be configured to torque retention component 600. As shown in FIG. 6, torqueing element 610 is illustrated as a handle. Alternatively, torqueing element 610 may be any other element that may be used to torque retention component 600 (e.g., a lever, among other examples). First inner surface 620 may comprise a threaded surface. First inner surface 620 may be configured to be threaded onto a hydraulic cylinder rod (e.g., a result of retention component 600 being torqued via torqueing element 610). Second inner surface 630 may comprise a non-threaded surface. Second inner surface 630 may be configured to receive a rod, such as rod 210. Bottom surface 640 be configured to mate with top surface 122 of second retention component 120. For example, bottom surface 640 may be configured to exert a force on second retention component 120 to cause second retention component 120 to transition from the expanded state to the compressed state.

As indicated above, FIG. 6 is provided as an example. Other examples may differ from what was described in connection with FIG. 6.

Figure 7:
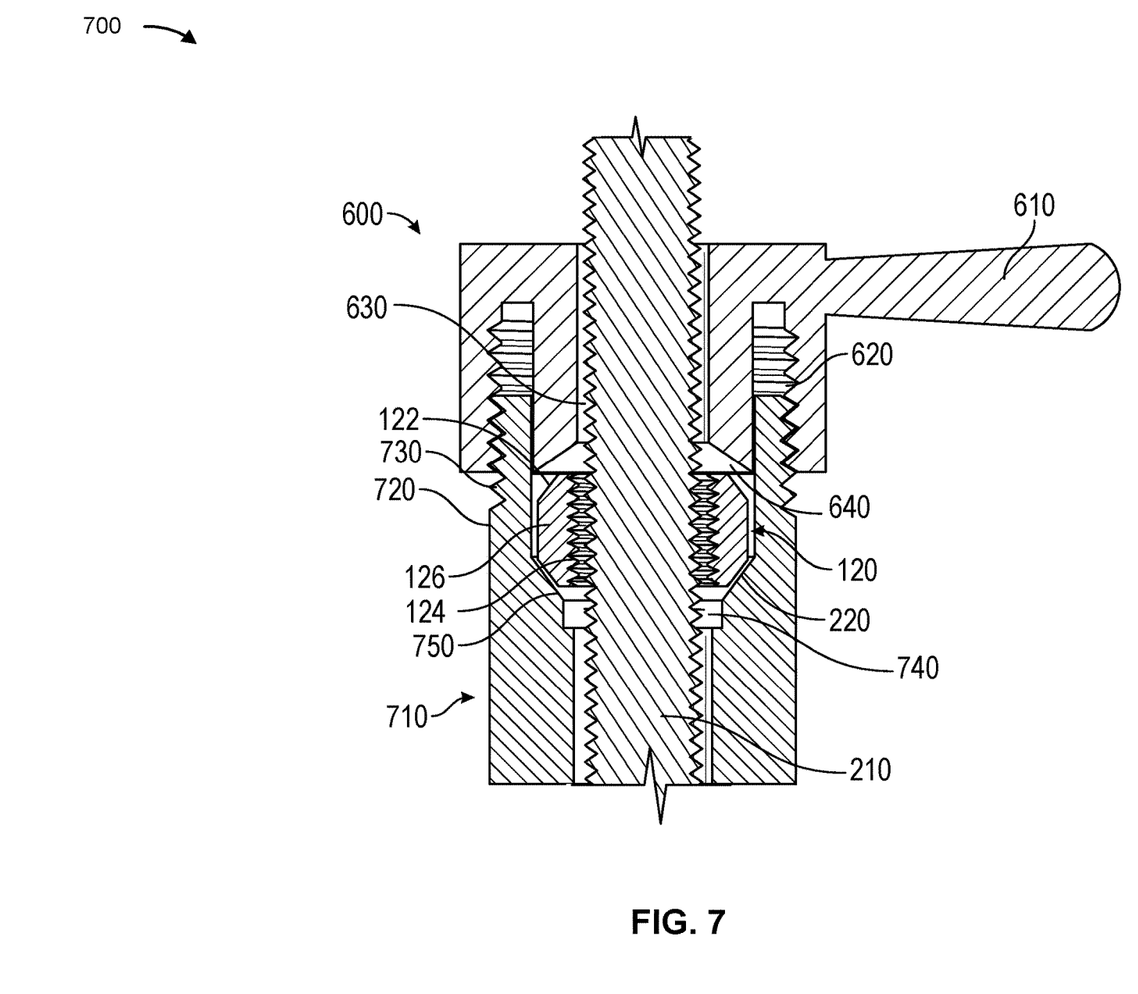
FIG. 7 is a diagram of an example cross-sectional view of an example retention device described herein.

FIG. 7 is a diagram of an example cross-sectional view of an example retention device 700 described herein. The elements of retention device 700 have been described above with respect to FIGS. 1-3 and 6. As shown in FIG. 7, retention device 700 may include retention component 600 and second retention component 120. Retention component 600 may be threaded on a hydraulic cylinder rod 710. Second retention component 120 may inserted in hydraulic cylinder rod 710 in a manner similar to the manner described above in connection with FIGS. 1-3. As shown in FIG. 7, hydraulic cylinder rod 710 may comprise an outer surface 720 comprising a threaded surface 730 and an inner surface 740 comprising a tapered surface 750. Threaded surface 730 may be configured to mate with first inner surface 620 of retention component 600. Inner surface 740 may be configured to receive a rod, such as rod 210.

As shown in FIG. 7, retention component 600 may be configured to be threaded onto threaded surface 730 of hydraulic cylinder rod 710. For example, torqueing element 610 may torque retention component 600 to cause first inner surface 620 to be threaded onto threaded surface 730 of hydraulic cylinder rod 710. As shown in FIG. 7, second inner surface 630 may be configured to receive rod 210.

As shown in FIG. 7, bottom surface 640, of retention component 600, may be configured to contact second retention component 120 and exert a force (e.g., a downward force or a normal force) on second retention component 120. As shown in FIG. 7, as a result of the force, second retention component 120 may be in the compressed state. For example, second retention component 120 (e.g., segments 126) may engage from rod 210.

Based on second retention component 120 being in the compressed state and based on retention component 600 retaining second retention component 120 in hydraulic cylinder rod 710, retention device 700 may retain rod 210 in hydraulic cylinder rod 130, in a manner similar to the manner described above in connection with FIG. 3. As retention component 600 is unthreaded from hydraulic cylinder rod 710 (e.g., a result of a torque by torqueing element 610), second retention component 120 may transition from the compressed state to the expanded state, in a manner similar to the manner described above in connection with FIG. 2.

As indicated above, FIG. 7 is provided as an example. Other examples may differ from what was described in connection with FIG. 7.

INDUSTRIAL APPLICABILITY

The present disclosure is directed to a retention device configured to retain a rod in a hydraulic cylinder rod of a hydraulic cylinder. In some implementations, the retention device comprises a collet nut and a retention ring. In some examples, the collet nut may be inserted in the hydraulic cylinder rod. The collet nut may be in the expanded state (e.g., may be disengaged from the rod) or in the compressed state (e.g., may engage the rod) when inserted in the hydraulic cylinder rod. The retainer ring may be torqued to cause the retainer ring to be threaded onto the hydraulic cylinder rod. A bottom surface, of the retainer ring, may contact the collet nut and retain the collet nut in the hydraulic cylinder rod. As the retainer ring is threaded onto the hydraulic cylinder rod, the bottom surface may exert a force on the collet nut. The force may push the collet nut downward into the hydraulic cylinder rod and cause the collet nut to transition from the expanded state to the compressed state (e.g., to engage the rod) or vice versa (e.g., to disengage from the rod).

Based on the collet nut being in the compressed state and based on the retainer ring retaining the collet nut in the hydraulic cylinder rod, the retention device may retain the rod in the hydraulic cylinder rod. In this regard, the retention device may prevent the rod from being released from the hydraulic cylinder rod in the event of a failure (of the rod) occurring when the hydraulic cylinder rod is being extended out of the hydraulic cylinder during a stroke of the hydraulic cylinder. The retention device may be configured to quickly cause the collet nut to transition between the expanded state and the compressed state by way of less than a threshold number of turns of the retainer ring (e.g., less than a threshold number of turns to unthread the retaining ring from the hydraulic cylinder rod or to thread the retaining ring to the hydraulic cylinder rod). In this regard, the collet nut may be quickly released between strokes of the hydraulic cylinder.

What is claimed is:

1. A retention apparatus for retaining a rod in a cylinder rod, the retention apparatus comprising:
a first retention component configured to retain the rod in the cylinder rod,
wherein the first retention component comprises an outer surface and a bottom surface,
wherein a first portion of the outer surface is a threaded surface and is adjacent to the bottom surface,
wherein the first portion is configured to be threaded onto a surface to cause the bottom surface to retain a second retention component in the cylinder rod and to cause the second retention component to engage the rod,
wherein a second portion of the outer surface is a non-threaded surface,
wherein at least a portion of the threaded surface extends outward beyond the non-threaded surface;
wherein the second retention component is configured to engage the rod,
wherein the second retention component comprises a pair of segments and a transition element between the pair of segments, and
wherein the transition element includes an elastomeric material.

2. The retention apparatus of claim 1,
wherein the second portion is configured to be torqued to cause the first portion to be threaded onto the cylinder rod.

3. The retention apparatus of claim 1, wherein the second portion comprises a torqueing element configured for torqueing the second portion.

4. The retention apparatus of claim 1, wherein an inner surface, of the second retention component, is a different threaded surface that is configured to engage and retain the rod in the cylinder rod.

5. The retention apparatus of claim 1,
wherein an inner surface, of the first retention component, is a different non-threaded surface.

6. The retention apparatus of claim 1,
wherein a portion, of an inner surface of the cylinder rod, is a tapered surface that matches a tapered surface of a bottom surface of the second retention component.

7. The retention apparatus of claim 1, wherein a shape of the second portion is a hexagonal shape.

8. The retention apparatus of claim 1,
wherein the first portion is a circular portion, and
wherein the second portion is a hexagonal portion.

9. A retention device, comprising:
a collet nut configured to be inserted in a cylinder rod and to engage a threaded rod inserted in the cylinder rod,
wherein the collet nut is configured to transition between a compressed state to engage the threaded rod and an expanded state to disengage from the threaded rod; and a retainer ring configured to retain the threaded rod in the cylinder rod,
wherein a first portion, of an outer surface of the retainer ring, is a threaded surface and is adjacent to a bottom surface of the retainer ring,
wherein a second portion, of the outer surface of the retainer ring, is configured to be torqued to cause the first portion to be threaded onto the cylinder rod and cause the bottom surface of the retainer ring to contact the collet nut and retain the collet nut in the cylinder rod,
wherein the bottom surface of the retainer ring is configured to cause the collet nut to transition from the expanded state to the compressed state as the bottom surface of the retainer ring contacts a top surface of the collet nut,
wherein the collet nut comprises a pair of segments and a transition element between the pair of segments,
wherein the transition element includes an elastomeric material, and
wherein a bottom surface of the collet nut comprises a tapered surface.

10. The retention device of claim 9,
wherein an inner surface, of the retainer ring, is a non-threaded surface.

11. The retention device of claim 9, wherein the collet nut comprises an inner surface,
wherein the inner surface, of the collet nut, is a threaded surface, and
wherein, when the collet nut is in the compressed state, the threaded surface is configured to engage the threaded rod.

12. The retention device of claim 11, wherein the collet nut is configured to transition from the compressed state to the expanded state as the first portion is unthreaded from the cylinder rod, and
wherein the threaded surface is configured to disengage from the threaded rod when the collet nut is in the expanded state.

13. The retention device of claim 9, wherein the top surface of the collet nut is another tapered surface.

14. The retention device of claim 9, wherein a portion, of an inner surface of the cylinder rod, includes a threaded surface, and
wherein the second portion, of the outer surface of the retainer ring, is configured to be torqued to cause the first portion, of the outer surface of the retainer ring, to be threaded onto the threaded surface of the cylinder rod.

15. The retention device of claim 9, wherein the collet nut includes a plurality of segments,
wherein the plurality of segments include the pair of segments,
wherein, in the compressed state, the plurality of segments are compressed inwardly toward the threaded rod to engage the threaded rod, and
wherein the transition element is configured to enable the collet nut to return to the expanded state, from the compressed state, by exerting an outward force between each pair of segments.

16. A retention system, comprising:
a collet nut configured to be inserted in a hydraulic cylinder rod and to engage a rod inserted in the hydraulic cylinder rod; and
a retention component configured to retain the rod in the hydraulic cylinder rod,
wherein the retention component comprises a first surface and a second surface,
wherein a portion, of the first surface, is a threaded surface and is adjacent to the second surface,
wherein the portion, of the first surface, is configured to be threaded onto the hydraulic cylinder rod to cause the second surface to retain the collet nut in the hydraulic cylinder rod,
wherein the second surface is configured to exert a force on a top surface of the collet nut to cause an inner surface, of the collet nut, to engage the rod,
wherein the collet nut comprises a pair of segments and a transition element between the pair of segments,
wherein the transition element includes an elastomeric material, and
wherein a bottom surface of the collet nut comprises a tapered surface.

17. The retention system of claim 16, wherein the portion is a first portion of the first surface,
wherein a second portion, of the first surface, is a non-threaded surface, and wherein the second portion, of the first surface, is configured to be torqued to cause the first portion to be threaded onto a threaded surface of the hydraulic cylinder rod.

18. The retention system of claim 16, wherein the inner surface, of the collet nut, is a threaded surface, and wherein the threaded surface, of the collet nut, is configured to engage a threaded surface of the rod.

19. The retention system of claim 18, wherein the threaded surface, of the collet nut, is configured to disengage from the rod as the portion, of the first surface of the retention component, is unthreaded from the hydraulic cylinder rod.

20. The retention system of claim 17, further comprising the hydraulic cylinder rod, wherein the hydraulic cylinder rod comprises an outer surface, wherein a portion, of the outer surface, comprises a threaded surface, and wherein the first portion, of the first surface of the retention component, is configured to be threaded onto the portion of the outer surface of the hydraulic cylinder rod.

\* \* \* \* \*